United States Patent [19]

Perronin et al.

[11] 4,023,981

[45] May 17, 1977

[54] PROCESS FOR THE PREPARATION OF PIGMENTARY METALLIC PARTICLES COATED WITH AN ORGANIC POLYMER AND COMPOSITIONS RESULTING THEREFROM

[75] Inventors: Jean Perronin, Chantilly; Bernard Jean Robert Gurtner, Creil, both of France

[73] Assignee: Produits Chimiques Ugine Kuhlmann, Paris, France

[22] Filed: June 4, 1975

[21] Appl. No.: 583,814

[30] Foreign Application Priority Data

June 14, 1974 France .............................. 74.20673

[52] U.S. Cl. ..................... 106/308 Q; 106/308 N; 260/42.14; 427/216; 427/221; 428/403
[51] Int. Cl.² .......................................... C09C 3/10
[58] Field of Search .......... 106/308 Q, 309, 308 M, 106/300, 288 Q, 308 N; 260/42.14, 42.21; 427/221, 216

[56] References Cited

UNITED STATES PATENTS

| | | | |
|---|---|---|---|
| 3,832,209 | 8/1974 | Baker et al. | 106/308 Q |
| 3,839,064 | 10/1974 | Vincent | 106/308 Q |
| 3,891,572 | 6/1975 | Moody et al. | 106/308 Q |

Primary Examiner—Winston A. Douglas
Assistant Examiner—J. V. Howard
Attorney, Agent, or Firm—Beveridge, DeGrandi

[57] ABSTRACT

A pigmentary composition prepared by coating metallic particles of pigment by means of a polymer or copolymer, by covering the polymerization or copolymerization "in situ" of at least one ethylenically unsaturated monomer having at least one oxygen or nitrogen heteroatom, and having a mono- or di-carborylic acid function, or an ester, nitrile or amide function or an N-substituted amide function, or an amine, alcohol or ether function, wherein the polymerization or copolymerization reaction is effected in a medium comprising at least one organic solvent in which the monomer is soluble and in the presence of at least one polymerization catalyst soluble in this medium, the monomer and the proportion thereof being selected so that the polymer or copolymer formed is insoluble in the organic solvent used.

15 Claims, No Drawings

PROCESS FOR THE PREPARATION OF PIGMENTARY METALLIC PARTICLES COATED WITH AN ORGANIC POLYMER AND COMPOSITIONS RESULTING THEREFROM

The present invention relates to a process for the preparation of pigmentary particles coated with an organic polymer and compositions resulting therefrom.

In our copending application Ser. No. 478,424 there is described and claimed a process for the preparation of pigmentary compositions which comprises coating the particles of pigment by means of a polymer or copolymer, by covering by the polymerisation or copolymerisation "in situ" of at least one ethylenically unsaturated monomer having at least one polymerisable double bond and containing at least three carbon atoms or at least two carbon atoms and a heteroatom and/or a halogen atom attached to one of the carbon atoms wherein the polymerisation or copolymerisation reaction is effected in a medium comprising at least one organic solvent in which the monomer is soluble, and in the presence of at least one polymerisation catalyst soluble in this medium, the monomer and the proportion thereof being selected so that the polymer or copolymer formed is insoluble in the organic solvent used, the ratio by weight of pigment to resin being from 10/90 to 95/5 and the amount of catalyst being from 0.1% to 10% with respect to the weight of the monomer to be polymerised.

The pigmentary compositions obtained according to the method of said copending Application disperse very quickly without any grinding in numerous methods of use.

Whilst pursuing its research, we have achieved an improvement in the above-described method of said copending Application in which the pigmentary particles are metallic particles.

According to the present invention there is provided a process for the preparation of pigmentary compositions which comprises coating metallic particles of pigment by means of a polymer or copolymer, by covering by the polymerisation or copolymerisation "in situ" of at least one ethylenically unsaturated monomer having at least one oxygen or nitrogen heteroatom, and having a mono- or di-carboxylic acid function, or an ester, nitrile or amide function, or an N-substituted amide function, or an amine, alcohol or ether function, wherein the polymerisation or copolymerisation reaction is effected in a medium comprising at least one organic solvent in which the monomer is soluble and in the presence of at least one polymerisation catalyst soluble in this medium, the monomer and the proportion thereof being selected so that the polymer or copolymer formed is insoluble in the organic solvent used.

The quantities of monomers used are preferably such that the ratio by weight of metallic particles of pigment to resin is from 50/50 to 99.5/05, and more preferably from 70/30 to 96/4.

The above-mentioned acid or anhydride functions correspond to mono- or dicarboxylic acids having at most 10 and preferably at most 5 carbon atoms.

Preferably the monomer is of a polar nature.

Exampes of N-substituted amides are N-methylol acrylamide and N-methylolmethacrylamide but the substituent may be alkyl with 1 to 5 carbon atoms.

The monomers preferably used in the process of the invention are mono- or dicarboxylic alkene acids comprising at most 10 and preferably at most 5 carbon atoms, their esters, nitriles, amides, the N-substituted derivatives of these amides, or the anhydrides of dicarboxylic alkene acids having at most 10 and preferably at most 5 carbon atoms.

Examples of monomers which may be used in the process of the invention are the following:

a. alkene-mono- or di-carboxylic acids, preferably the acids containing up to five carbon atoms, for example acrylic, methacrylic, crotonic, maleic, fumaric, itaconic, citraconic, senecioic, oleic or sorbic acid;

b. esters of these acids, such as methyl, ethyl, butyl, 2-methyl-propyl, hexyl, heptyl, 2-ethyl-hexyl, glycidyl, ethyleneglycol or propyleneglycol acrylate or methacrylate, heptyl lauryl, tridecyl, stearyl or 2-N,N-dimethylamino-ethyl methacrylate, N-methyl-2-(2-perfluorohexyl-ethylsulphonylamino)-ethyl acrylate, dimethyl, diethyl, dipropyl, dibutyl maleate or fumarate, dimethyl itaconate, methyl, ethyl, butyl oleate, ethyl, or butyl sorbate, ethyl ricinoleate, methyl acid maleate, octyl acid maleate, butyl acid itaconate, ethyleneglycol dimethacrylate or propyleneglycol dimethacrylate, the acrylates or methacrylates of monoethoxy-polyglycols, or 2-cyano-ethyl acrylate;

c. Anhydrides of alkene-dicarboxylic acids such as maleic anhydride or citraconic anhydride;

d. vinyl esters of saturated aliphatic acids such as vinyl acetate, propionte, 2-methyl-propionate, isovalerate 3,3-dimethyl-butanoate, 3,3- or 3,5- or 5,5-dimethyl-hexanoate or a mixture thereof, 3,3- or 3,5- or 5,7- or 7,7-dimethyl-octanoate or a mixture thereof or vinyl 2,2-dimethyl-octanoate;

e. monomers with a cross-linking action, such as bis-(2-methacryloyloxy-ethyl) acid phosphate, acrylamide, methacrylamide, N-methylol-acrylamide, N-methylolmethacrylamide, tetra-allyloxyethane, methylene-bis-acrylamide, glyoxal bis-acrylamide, bis-acrylamidoacetic acid, triallyl phosphite, triallyl phosphate, diallyl terephthalate, diallyl maleate, diallyl oxalate or diallylamine;

f. Other monomers such as allylamine, allyl acetate, allyl hexanoate, allyl ether, allyl bromide, allyl sodium sulphonate, ethylvinylether, butylvinylether, isobutylvinylether, cetyl-vinylether, 1,3,3-trimethoxy-propene, 3-chloro-isobutylene, 2-chloro 1,3-butadiene, vinyl chloride, vinylidene fluoride, vinyl phosphate, vinyl phosphonate, 1,2-propylene-di-10-undecenoate, acrylontrile, 3-amino-crotononitrile, methacrylonitrile, crotononitrile, 2-chloro-acrylonitrile, methyleneglutaronitrile, vinylidene cyanide, vinylpyridine, vinylpyrrolidone, or sodium vinylsulphonate.

Other monomers with a cross-linking action, such as trimethylolpropane trimethacrylate, trimethylolpropane triacrylate, pentaerythritol triacrylate and pentaerythritol tetraacrylate, may also be used.

Classes of organic solvents which may be used in the process of the present invention include the aliphatic, aromatic and halogenated hydrocarbons, alcohols, ketones, esters and ethers.

Examples of organic solvents which may be used are the aliphatic hydrocarbons such as hexane, heptane, octane, cyclohexane methylcyclohexane, white spirit, mixtures of those more generally called in industry "gasolines", aromatic hydrocarbons such as benzene, toluene, xylene, halogenated hydrocarbons such as trichloroethylene, perchloroethylene, chlorobenzene, trichlorobenzene, chlorofluoromethanes, chlorofluoroethanes, alcohols such as methanol, ethanol, n-propanol, 1-methyl-ethanol, n-butanol, 2-methypropanol, 1,1-dimethyl-ethanol, ketones such as 2-propanone, 2-butanone, 4-methyl-2-pentanone, eters such as ethyl acetate, propyl acetate, 1-methylethyl acetate, ethers such as diethyl ether, ethylpropyl ether, tetrahydrofuran, and 1,4-dioxan.

According to one preferred embodiment of the present invention, the reaction is carried out in the absence of a surface-active compound. The presence of the latter may possibly even be harmful.

The metallic particles used in the process of the present invention may be formed from aluminium, copper tin, lead, zinc, iron, nickel, chromium, cobalt, antimony, silver beryllium, bismuth, boron, cadmium, magnesium, manganese, molybdenum, niobium, silicon, tantalum, titanium, tungsten, vanadium, zirconium or their alloys.

The metallic particles may in particuar be formed from bronzes, the symbols for the constituent elements of these alloys being Cu—Sn, Cu—Sn—Ni, Cu—Zn—Ni, Cu—Sn—Ag and Cu—Zn—Al. They may also be formed from cupro-lead (Cu—Pb—Sn); or hard-soldering metals symbolised by Cu—Zn, Cu—Mn, Cu—Sn, Cu—Mn—Ni, Ag—Cu, and Zn—Cd; brasses (Cu—Zn—Al); cupro-aluminium; cupro-phosphorus, cast-iron (Fe—C—Si); ferroalloys such as Fe—Cr—Mo—V or Fe—V—Ti—Si—B; stainless steel such as Fe—Cr—Ni; Monel metal; Iconel alloy (Ni—Cr—Fe); ferro-nickel, Nickel-chromium; aluminium-magnesium; or zirconium-nickel.

The metallic particles may be coated with a layer of one or a plurality of oxidized metallic compounds, in particular metallic oxide. When the metal is aluminium, for example, the coating may be aluminium oxide.

In order to start the polymerisation reaction a catalyst capable of producing free radicals is used, preferably a peroxide or monoazo catalyst, free of metal. Examples of peroxide compounds are tert-butyl peroxide, cumene hydroperoxide, tert-butyl hydroperoxide, tert-butyl perbenzoate, di-2,2-(tert-butyldioxy)-butane, tert-butyl peroctoate, benzoyl peroxide, diacetyl peroxide, succinyl peroxide, lauroyl peroxide, tert-butyl perpivalate, 2,4-dichloro-benzoyl peroxide, isopropyl percarbonate, cyclohexyl percarbonate, acetylcyclohexane-sulphonyl peroxide, 1,1,4,4-tetramethyl-butylene diperbenzoate, tert-butyl perisononanoate. An azo catalyst such as for example 2,2'-azo-bis (isobutyronitrile), 2,2'-azo-bis-(isovaleronitrile), 2,2'-azo-bis-(methyl-glutaromononitrile), 1,1'-azo-bis-(1-cyanocyclohexane) or 2,2'-azo-bis-(isobutyramidine) may also be used. It is advantageous to use a mixture of two or more catalysts which differ in their "half-life" time, determined at the temperature at which the polymerisation is effected. By "half-life" time is meant the time at the end of which only half the initial amount of catalyst remains. The amount to be used is preferably from 0.1% to 10% (preferably 1% to 8% or 5% to 10%) with respect to the weight of the monomers to be copolymerised.

The polymerisation is generally effected at a temperature between 50° C. and 100° C. but it is possible to operate at lower or higher temperatures. For example, the use of a redox catalyst, such as the system benzoyl peroxide-2,3-butane-dione, may be useful to activate the reaction or lower the temperature of polymerisation.

In order to reglate the length of chain and the molecular weight of the polymers entering into the pigment compositons according to the invention, chain transfer agents may be used such as for example alkyl mercaptans (tertio-dodecylmercaptan, n-octylmercaptan), carbon tetrachloride or triphenylmethane.

Finally the polymerisation may be carried out discontinuously (whereinall the monomers are added together), continuously (wherein the monomers are added continuously wihtut interruption), or gradually (wherein the monomers are added a little at a time).

The present invention also relates to the pigmentary compositions obtained according to the process of the present invention. These compositions are mainly in powder form. They disperse very easily when used in numerous methods and have, moreover, increased resistance to chemical and atmospheric agents such as saline mist, sulphur dioxide, flue gases, and acid or alkaline agents; the colour yield is therefore excellent and durable. They may be used advantageously on their own or mixed with soluble or insoluble dyestuffs, in numerous fields of use, using metallic particles, such as the pigmentation of inks, plastics materials, paints, coatings, creams, binding agents or other preparations for producing metallized, coloured or printed effects.

The invention is illustrated by the following Examples, in which the parts indicated are parts by weight.

EXAMPLE 1

The following ingredients are charged into a reactor provided with a cooler and a stirring system:

- 100 parts of lamellar aluminium powder, developed from a metal with a tire higher than 90%, whose particle size is of the order of 40 microns and whose coating of metal lamellae coprises a film of aluminium oxide whose content varies from 5 to 15% of the total mass,
- 300 parts of heptane
- 20 parts of methyl methacrylate
- 5 parts of acrylonitrile
- 1 part of tert-butyl perpivalate
- 1 part of tert-butyl peroctoate.

The whole mixture is stirred and copolymerization is effected automatically, causing the temperature to rise to 90° C. within the space of 3 hours. When polymerization has finished, the reactional mixture is filtered. After this has been completely dried, 120 parts of a pigmentary composition designated by ($A_1$) are obtained, this composition comprising approximately 80% of pigmentary aluminium and 20% of methyl methacrylate acrylonitrile copolymer (80—20). This pigmentary composition is friable and may be converted to powder.

EXAMPLE 2

The same reaction is effected as in Example 1, but 5.5 parts of acrylonitrile and 5.5 parts of methyl methacrylate are used. A pigmentary composition designated by ($A_2$) is obtained which comprises approximately 90% of pigment and 10% of acrylonitrile - methyl methacrylte copolymer (50—50).

Particularly advantageous results are thus obtained with respect to the colour development of the pigmentary compositions ($A_1$) and ($A_2$) and most particularly with respect to their resistance to chemical agents in epoxy-type powder paints. These properties are shown by the following test.

A quantity of pigmentary composition, corresponding to 1 part of pure pigment, which is made up to 20 parts by the addition of a commercial epoxy powder paint comprising a white pigment (this paint is sold under the name of RESICOAT— ref. 880 0026, and commercialised in France by ASTRAL) is mixed in a sutable container. This mixture is then applied by an electrostatic gun to a previously scoured steel plate, then oven-dried for 8 minutes at 180° C. After cooling, a coating is obtained which is uniform and has a metallized effect. A drop of N/10 soda is put on the plate which has been painted under these conditions and the fastness to soda of the pigmentary aluminium included in the paint is measured in minutes; a poor fastness to soda is shown by the appearance of a lighter stain at the place where the drop was put.

The said suitable container mentioned above is cylindrical in shape and provided with a lid; it is stirred by being rotated in the presence of glass or steel balls or rods.

The following table gives the results which have been obtained with the pigmentary compositions ($A_1$) and ($A_2$) according to the invention, and with the same untreated pigment

| Product | Fastness to soda |
| --- | --- |
| Untreated pigment | 15 minutes |
| Pigmentary composition ($A_1$) | <30 minutes |
| Pigmentary compositions ($A_2$) | <30 minutes |

EXAMPLE 3

Using the same reaction as in Example 1 with the products indicated in the following table, two pigmentary compositions ($A_3$) and ($A_4$) are prepared which comprise 90% and 95% respectively of metallic pigment and 10% and 5% respectively of methyl methacrylate-acrylonitrile copolymer (80—20).

| Products used (in parts) | Pigmentary composition ($A_3$) | ($A_4$) |
| --- | --- | --- |
| Aluminium powder as defined in example 1 | 100 | 100 |
| Methyl methacrylate | 10 | 5 |
| Acrylonitrile | 2.5 | 1.25 |
| Tert-butyl perpivalate | 0.5 | 0.25 |
| Tert-butyl peroctoate | 0.5 | 0.25 |

These two pigmentary compositions are subjected to the test with soda, under the same conditions of use as described in EXAMPLE 2.

The following table gives the results which have been obtained with th products ($A_3$) and ($A_4$) according to the invention, with the same untreated pigment, and with the same pigment having been subjected to a conventional surface treatment with stearin.

| Product | Fastness to soda |
| --- | --- |
| Untreated pigment | 15 minutes |
| Stearin-treated pigment | 5 minutes |
| Pigmentary composition ($A_3$) | >30 minutes |
| Pigmentary composition ($A_4$) | 30 minutes |

EXAMPLE 4

A mixture of 20 parts of $\beta$ copper phthalocyanine in powder form, 80 parts of aluminium powder as defined in Example 1 and 300 parts of heptane are ground for one night in a rod-grinder. After homogeneous dispersion has been obtained, the following ingredients are added:

| Acrylonitrile | 7 parts |
| --- | --- |
| Methylmethacrylate | 27 parts |
| Tert-butyl perpivalate | 1 part |
| Tert-butyl peroctoate | 1 part |

After polymerization as in Example 1, cooling and the elimination of the organic phase have been effected, 125 parts of a pigmentary composition are obtained which comprises 60% of pigmentary aluminium, 15% of $\beta$ copper phthalocyanine and 25% of acrylonitrile-methyl methacrylate copolymer (20–80)..

When applied and tested under the same conditions as in Example 2, this product, exactly like the pigmentary compositions ($A_1$), ($A_2$), ($A_3$) and ($A_4$), has excellent resistance to the test with soda, and, simultaneously with the metallized effect, causes a blue colouration to be obtained on the coating which was prepared from an epoxy powder paint.

EXAMPLE 5

The pigmentary compositons ($A_2$) and ($A_3$) may also be used advantageously in the field of textile printing, as shown by the uses mentioned below.

The printing pastes ($B_1$) and ($B_2$) are prepared by mixing the following ingredients and stirring thouroughly.

| Product (in parts) | Printing paste ($B_1$) not in accordance with the invention | Printing paste ($B_2$) according to the invention |
| --- | --- | --- |
| Aluminium powder as defined in example 1 (i.e. untreated) | 100 | |
| Pigmentary composition ($A_2$) | | 100 |
| Surface-active agent 1 | 30 | 30 |
| Glycerin | 80 | 80 |
| Thickening agent 2 | 220 | 220 |
| Latex 3 | 450 | 450 |
| Water | 120 | 120 |

The surface-active agent 1 is a condensate of 1 molecule of oleic acid with 20 molecules of ethylene oxide in an aqueous solution with a 33% content of dry material.

The thickening agent 2 is basically high-viscosity sodium alginate.

37% of the latex 3 is dry material in accordance with Example 4 of French Pat. No. 1,263,236.

Then the printing pastes ($B_3$) and ($B_4$) are prepared by mixing the following ingredients and stirring thoroughly:

| Product (in parts) | Printing paste ($B_3$) not in accordance with the invention | Printing paste ($B_4$) according to the invention |
| --- | --- | --- |
| Aluminium powder as defined in example 1 (i.e. untreated) | 100 | |
| Pigmentary composition ($A_3$) | | 100 |
| Butyl phthalate | 200 | 200 |
| Ethyl acetylacetate | 420 | 420 |

| Product (in parts) | Printing paste (B₃) not in accordance with the invention | Printing paste (B₄) according to the invention |
|---|---|---|
| Vinyl polyacetate 4 | 280 | 280 |

The vinyl polyacetate 4 is of the so-called "mass" quality (sold by Rhône-Pulenc).

The printing pastes $(B_1)$, $(B_2)$, $(B_3)$ and $(B_4)$ are in this instance printed with a flat frame on a rayon satin fabric which has been previously dyed black.

The printed fabric thus obtained is subjected to the following test: the fabric is soaked in an aqueous bath containing 5g/l of sodium carbonate for 1 hr. 30 minutes, at ambient temperature. At the end of this period, the fabric is rinsed and dried; it is found that the pastes $(B_2)$ and $(B_4)$ give prints which have a resistance to this alkaline treatment which is far superior to the basic resistance of the pastes $(B_1)$ and $(B_3)$, where the reduction in the silvered effect is much more significant.

EXAMPLE 6

The following ingredients are charged into a reactor provided with a cooler and a stirring system:
  100 parts of a bronze-coloured pigment in powder form comprising a brass alloy (80% of copper, 19.5% of zinc and 0.5% of aluminium), with a granulation of less than 40 microns
  200 parts of heptane
  11 parts of ethylene glycol dimethacrylate
  0.4 part of tert-butyl perpivalate
  0.4 part of tert-butyl peroctoate Then, by using the same reactin for polymerization as in Example 1, 105 parts of a pigmentary composition are obtained which comprises approximately 90% of the bronze-coloured pigment in powder form as defined above and 10% of ethylene glycol polydimethacrylate. This pigmentary composition is friable and may easily be converted into powder.

When incorporated in an epoxy-type powder paint under the same conditions as in Example 2 and when subjected then to the same test with soda, this product has a fastness to soda which is far superior to 40 minutes.

EXAMPLE 7

The following ingredients are charged into a reactor provided with a cooler and a stirring system:
  100 parts of aluminium powder as defined in Example 1
  300 parts of methanol
  11 parts of stearyl methacrylate
  0.5 part of tert-butyl perpivalate
  0.5 part of tert-butyl peroctoate Then, whilst using the same reaction as in Example 1, a metallic pigmentary composition $(C_1)$ is obtained which comprises approximately 90% of aluminium and 10% of stearyl polymethacrylate.

This product has a remarkable resistance to water, as the following test shows.

A quantity of pigmentary composition corresponding to 1 part of pure pigment and 10 parts of water is introduced into a suitable container, this container is then hermetically sealed and left for 24 hours at 25° C.

Under these conditions an untreated pigment is affected by water, and a significant release of hydrogen is noted, whereas the compound $(C_1)$ has remained intact and has not deteriorated in any way.

When subjected to the same test, the pigmentary compositions $(A_1)$, $(A_2)$, $(A_3)$ and $(A_4)$ behave identically to the product $(C_1)$; but when the latter is incorporated in a powder paint, it has the property of being more pellicular than the products $(A_1)$, $(A_2)$, $(A_3)$ and $(A_4)$; the particles have a greater tendency to rise to the surface of the coating whilst the paint is being oven-dried.

EXAMPLE 8

The following ingredients are charged into a reactor provided with a cooler and a stirring system:
  100 parts of aluminium powder as defined in Example 1
  300 parts of heptane
  18 parts of ethylene glycol dimethacrylate
  1.4 part of tert-butyl peroctoate.

The whole mixture is stirred and polymerization is effected automatically, thus causing the temperature to rise to 90° C., within the space of 3 hours. After filtering and drying, 114 parts of a pigmentary composition $(A_5)$ are obtained which comprises approximately 85% of pigmentary aluminium and 15% of ethylene glycol polydimethacrylate. This pigmentary composition is in the form of very light powder.

When subjected to the same test as that described in Example 2, the product $(A_5)$ has excellent fastness to soda.

EXAMPLE 9

The colour development of the pigmentary compositions $(A_1)$, $(A_2)$, $(A_3)$, $(A_4)$ and $(A_5)$ plus their resistance to chemical agents are advantageous not only in epoxy-type powder paints, but also in polyester-type and acrylic-type powder paints. These properties are shown by the following test:

A quantity of pigmentary composition, corresponding to 1 part of pure pigment which is made up to 20 parts by the addition of a polyester powder paint sold commercially under the name of RESICOAT, ref. R.1073 (commercialised in France by ASTRAL) is mixed in a suitable container. After this is applied by an electrostatic gun to a previously scoured steel plate, and oven-drying and cooling have been effected, a coating is obtained which has a metallized effect. A drop of N/10 soda is placed on the plate which has been painted under these conditions: a poor fastness to this alkaline medium would be evident by the appearance of a lighter stain where the drop was placed.

Under these conditions, the pigmentary compositions $(A_1)$ to $(A_5)$ according to the invention have a resistance which is at least five times higher than the same untreated pigment.

The method according to this Example is repeated for the same pigmentary compositions $(A_1)$, $(A_2)$, $(A_3)$, $(A_4)$ and $(A_5)$, replacing the addition of a polyester powder paint by the addition of an acrylic powder paint (sold commercially under the name RESICOAT, ref. 88 30 007, commercialised in France by ASTRAL), and practically identical results are obtained.

EXAMPLE 10

The following ingredients are charged into a reactor provided with a cooler and a stirring system:
  100 parts of aluminium powder as defined in Example 1

300 parts of heptane
9 parts of ethylene glycol dimethacrylate
9 parts of N-methyl-2-(2-perfluoroethyl-sulphony-amino)-ethylacrylate
1.4 part of 2,2′-azo-bis (isobutyronitrile).

The whole mixture is stirred and copolymerization is effected automatically, thus causing the temperature to rise to 90° C within the space of 3 hours. After cooling, filtering and drying have been effected, 114 parts of a pigmentary composition ($A_6$) are obtained which comprises approximately 85% of pigmentary aluminium and 15% of ethylene-glycol dimethylacrylate-N-methyl-2-(2-perfluoroethylsulphonylamino)-ethyl-acrylate copolymer (50-50).

This pigmentary composition, used in a powder paint having an epoxy structure, has the property of being "pellicular", i.e. the metal lamellae tend to be concentrated at the surface of the coating; but this does not in any way affect the resistance of the product with regard to chemical agents, as the following test shows:

This pigmentary composition is subjected to the test with soda, under the same conditions of use as those described in Example 2.

The following table gives the results which have been obtained with the product ($A_6$), with the same untreated pigment, and with the same aluminium powder pigment which has been subjected to a surface treatment with stearin, this treatment also enabling a "pellicular" pigment to be obtained.

| Product | Fastness to soda |
|---|---|
| Untreated pigment | 15 minutes |
| Stearin-treated pigment (not in accordance with the invention) | 5 minutes |
| Pigmentary composition ($A_6$) | >30 minutes |

EXAMPLE 11

The pigmentary composition ($A_5$) also has excellent resistance to acid chemical agents, as the following test proves:

A quantity of pigmentary composition, corresponding to 1 part of pure pigment which is made up to 20 parts by the addition of a commercial epoxy powder paint (sold under the name of RESICOAT, ref. 880, 0026, commercialised in France by ASTRAL), is mixed in a suitable container. This mixture is then applied by electrostatic gun to a previously scoured steel plate, then oven-dried for 8 minutes at 180° C. After cooling, a coating is obtained which is uniform and has a metallized effect. Then half of the plate is soaked in a 30% aqueous solution of sulphuric acid for 16 hours, the temperature being kept at 25° C.; a whitening of the surface of the coating indicates where the aluminium has been affected by the sulphuric acid.

The following table gives the results which have been obtained with the pigmentary composition ($A_5$) according to the invention and with the same untreated pigment.

| Product | Whitening caused by the affect of sulphur |
|---|---|
| Untreated pigment | Considerable |
| Pigmentary composition ($A_5$) | None |

What we claim is:

1. A process for the preparation of pigmentary compositions which comprises coating metallic particles of pigment by means of a polymer or copolymer, by covering by the polymerization or copolymerization "in situ" of at least one ethylenically unsaturated monomer having at least one oxygen or nitrogen heteroatom, and having a mono- or di-carboxylic acid function, or an ester, nitrile or amide function, or an N-substituted amide function, or an amine, alcohol or ether function, wherein the polymerization or copolymerization reaction is effected in a medium comprising at least one organic solvent in which the monomer is soluble and in the presence of at least one polymerization catalyst soluble in this medium, the monomer and the proportion thereof being selected so that the polymer or copolymer formed is insoluble in the organic solvent used.

2. A process according to claim 1 in which the monomer is selected from the group consisting of mono- and di-carboxylic alkene acids having up to 10 carbon atoms, the esters, nitriles, amides and N-substituted derivatives of amides thereof, and anhydrides of dicarboxylic alkene acids having up to 10 carbon atoms.

3. A process according to claim 1 in which the monomer is selected from the group consisting of mono- and di-carboxylic alkene acids having up to 5 carbon atoms, the esters, nitrile, amides and N-substituted derivatives of amides thereof, and anhydrides of dicarboxylic alkene acids having up to 5 carbon atoms.

4. A process according to claim 1 in which the metallic particles are comprised of metals selected from the group consisting of aluminium, copper, tin, lead, zinc, iron, nickel, chromium, cobalt, antimony, silver, beryllium, bismuth, boron, cadmium, magnesium, manganese, molybdenum, niobium, silicon, tantalum, titanium, tungsten, vanadium, zirconium, and their alloys.

5. A process according to claim 1 in which the metallic particles are coated with a layer of at least one oxygenated metallic compound.

6. A process according to claim 1 in which the metallic particles are coated with a layer of at least one metallic oxide.

7. A process according to claim 1 in which the ratio by weight of metallic particles of pigment to resi is from 50/50 to 99.5/0.5.

8. A process according to claim 1 in which the ratio by weight of metallic particles of pigment to resi is from 70/30 to 96/4.

9. A process according to claim 1 in which the organic solvent is selected from the group consisting of aliphatic hydrocarbons, aromatic hydrocarbons, halogenated hydrocarbons, alcohols, ketones esters and ethers.

10. A process according to claim 1 which is effected in the absence of a surface-active compound.

11. a process according to claim 1 in which a peroxide or monoazo catalyst, free of metal, is used.

12. A process according to claim 1 in which a ixture of catalysts is used.

13. A process according to claim 1 in which a mixture of catalysts comprising catalysts having different half-life times is used.

14. Pigmentary composition obtained according to the process of claim 1.

15. A pigmentary composition in powder form made in accordance with the process of claim 1.

* * * * *